Sept. 5, 1944.  H. W. GUELKER  2,357,467
PISTON RING
Filed Jan. 13, 1943

INVENTOR;
HAROLD W. GUELKER
BY
ATTORNEYS

Patented Sept. 5, 1944

2,357,467

UNITED STATES PATENT OFFICE 2,357,467

PISTON RING

Harold W. Guelker, St. Louis, Mo., assignor to McQuay-Norris Manufacturing Company, St. Louis, Mo., a corporation of Delaware Application January 13, 1943, Serial No. 472,191

3 Claims. (Cl. 309—45)

The invention relates to a piston ring, more particularly to the type generally known as a composite oil ring.

Piston rings of the character to which this invention relates are in general shown by the prior copending application of Dallas M. Smith, Serial No. 312,759, filed January 6, 1940. The piston ring shown in the Smith application consists of a pair of ribbonlike steel cylinder engaging members separated by a corrugated spacer element, all of which are arranged to cooperate with an expander spring. Some difficulties have been encountered in the use of piston rings of the character referred to particularly with reference to lack of control of blowby and non-uniformity of oil metering.

In principle the present invention contemplates that such difficulties are due to the tendency of the cylinder engaging members of such a piston ring to circumferentially creep relative to each other and to the presence of a substantial end clearance even when the cylinder engaging ribbonlike members are compressed to cylinder size.

An important object of the invention is to provide a piston ring of the character described which will reduce the blowby.

Another object of the invention is to provide a piston ring of the character described whereby oil is controlled throughout the entire circumference of the cylinder.

A further object is to construct a composition piston ring wherein the parts are held against circumferential creeping.

Other and further important objects of the present invention will be apparent from the following description and the accompanying drawing.

Generally stated, in accordance with the present invention, the cylinder engaged ribbon-like ring members in a composite ring of the character above referred to are arranged to interlock with the spacer element thereby to prevent relative circumferential creeping by the cylinder engaging members and the spacer.

In some cases, it may suffice to thus interlock one only of the cylinder engaging members with the spacer particularly when, as in accordance with one embodiment of the present invention, the interlocked cylinder engaging member is provided with an offset portion which slightly overlaps the free end of that ring so that the interlocked ring engages the cylinder throughout a perimeter slightly in excess of the circumference of the cylinder.

One embodiment of the present invention is illustrated in the accompanying drawing in which.

Figure 1:
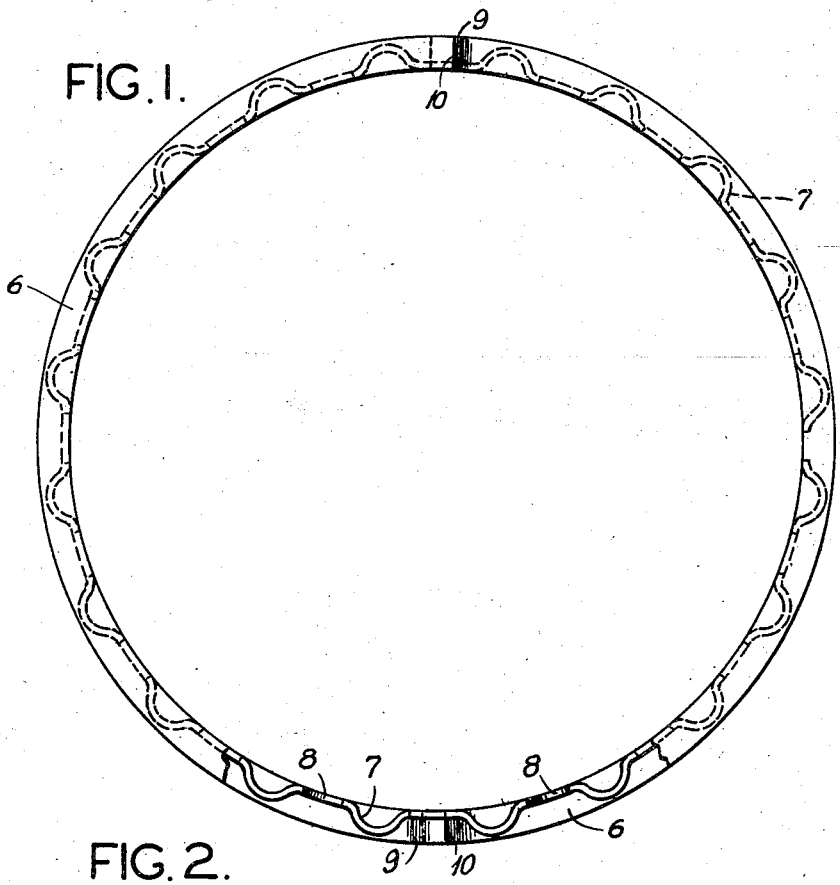
Fig. 1 is a plan view of the piston ring of the present invention, a part broken away to show the relation of the parts.
Figure 2:
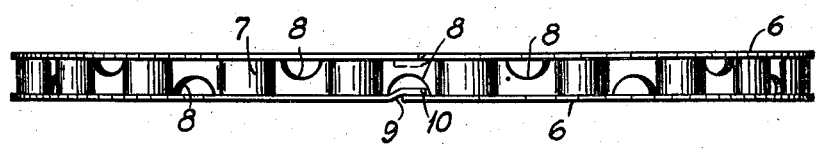
Fig. 2 is a side elevation of the piston ring of this invention.

As shown by the drawing, the ring consists of three parts, namely, two ribbon-like cylinder engaging ring members 6, and a spacer member 7. The spacer is provided with a series of indentations 8 in the edges thereof which normally operate to ventilate the ring, but in accordance with the present invention at least one of such indentations serves the additional purpose of interlocking with an offset portion of the cylinder engaging member.

In order to accomplish such interlocking in the embodiment shown in the drawing, one end of the ribbon-like ring member 6 is axially offset as shown at 9 and slightly overlapped with the opposite free end 10 of the same ring. When compressed to cylinder size, the offset end 9 slightly overlaps the free end 10, and the offset portion extends parallel to and contiguous with the opposite free end for a distance sufficient to accommodate expansion of the ring when operated in tapered cylinders. Consequently, the arrangement is such that a cylinder engaging portion of the ribbon-like ring member 6 contacts the cylinder at all times throughout the circumference of the ring very slightly in excess of the cylinder circumference.

Figure 3:
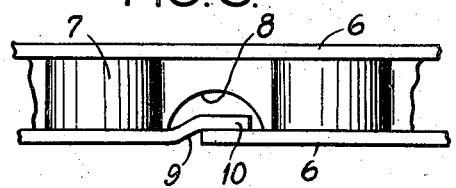
Fig. 3 is a fragmentary view of the piston ring of this invention showing in detail the interlocking of the parts.
Figure 4:
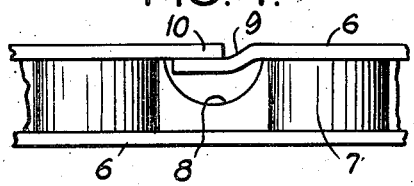
Fig. 4 is a fragmentary view of the piston ring of this invention showing in detail the interlocking of the parts of the top ring member.

In order to interlock the cylinder engaging member 6 with the spacer, the offset portion 9 may be engaged with one of the recesses 8 as clearly shown in Figures 3 and 4. It will be observed that the arrangement shown provides a plain face for engagement with the side walls of the piston ring groove. Frequently, it is unnecessary to interlock more than one of the cylinder engaging rings 6 with the spacer as shown but when it is desired to interlock both of them, it is preferable that the offset portion 9 of the lower ring be substantially circumferentially displaced from the offset portion 9 of the upper ring 6 as, for example, diametrically opposite each other. Where control of blowby is desired, it will be understood that the uppermost ring member 6 must be provided with the overlapping end whether or not the lower ring member 6 is so provided.

It will, of course, be understood that various details of construction may be varied through a wide range without departing from the principles of this invention, and it is, therefore, not the purpose to limit the patent granted hereon otherwise than necessitated by the scope of the appended claims.

I claim as follows:

1. In a piston ring having in combination two ribbon-like ring members, and a spacer member having recesses therein, one end of each of the two ring members being offset and overlapping onto the opposite end, the overlapped portions of the ribbon-like ring members fitted into recesses in the spacer.

2. In a piston ring having in combination two ribbon-like ring members, and a spacer member having recesses therein, one end of each of the ribbon-like ring members being offset and overlapping onto the opposite end, the overlapped portions of the ribbon-like ring members fitted into recesses in the spacer to interlock the parts when installed onto a piston.

3. In a piston ring having in combination two ribbon-like ring members, and a spacer member having recesses therein, one end of one of the ribbon-like ring members being offset, the offset end overlapped onto the opposite end, the overlapped portion fitted into any one of a series of recesses in the spacer member, the other ribbon-like ring member remaining the same throughout, the combination forming a piston ring locked on one side and remaining unlocked on the opposite side, when installed on a piston.

HAROLD W. GUELKER.

CERTIFICATE OF CORRECTION.

Patent No. 2,357,467.　　　　　　　　　　　September 5, 1944.

HAROLD W. GUELKER.

It is hereby certified that error appears in the printed specification of the above numbered patent requiring correction as follows: Page 1, first column, line 32, for the word "composition" read --composite--; and that the said Letters Patent should be read with this correction therein that the same may conform to the record of the case in the Patent Office.

Signed and sealed this 31st day of October, A. D. 1944.

Leslie Frazer (Seal)　　　　　　　　　　　Acting Commissioner of Patents.